United States Patent [19]

Smith

[11] Patent Number: 5,009,256

[45] Date of Patent: Apr. 23, 1991

[54] CORD-TYPE TIRE TRACTION DEVICE

[75] Inventor: Franklin G. Smith, Portland, Oreg.

[73] Assignee: Manufacturer's Consultants, Inc., Portland, Oreg.

[21] Appl. No.: 288,619

[22] Filed: Dec. 21, 1988

[51] Int. Cl.$^5$ .................. B60C 27/06; B65H 69/04; A44B 1/04; A44B 11/25

[52] U.S. Cl. .................... 152/221; 152/241; 289/18.1; 24/115 H; 24/116 R; 24/128

[58] Field of Search ............... 152/178, 179, 217, 221, 152/222, 233, 241, 373; 289/1.2, 18.1; 24/115 H, 116 R, 128

[56] References Cited

U.S. PATENT DOCUMENTS

| | | |
|---|---|---|
| 990,651 | 4/1911 | Heer . |
| 1,151,389 | 8/1915 | Preston . |
| 1,204,887 | 11/1916 | La Fleur . |
| 1,293,424 | 2/1919 | Hartung ............................ 152/221 |
| 1,578,803 | 3/1926 | Comey . |
| 1,718,509 | 6/1929 | West ................................. 152/221 |
| 1,932,576 | 10/1933 | Dodge . |
| 2,085,204 | 6/1937 | Sullivan . |
| 2,252,027 | 8/1941 | Pasquarella ....................... 152/221 |
| 2,693,838 | 11/1954 | Dandurand et al. ........... 152/225 R |
| 3,752,204 | 8/1973 | Ouellette ........................... 152/219 |
| 3,884,283 | 5/1975 | Engel ............................... 152/213 A |
| 4,055,210 | 10/1977 | Mongault . |
| 4,146,076 | 3/1979 | Matsui . |
| 4,155,390 | 5/1979 | Okamura . |
| 4,185,674 | 1/1980 | Giannone ........................ 152/233 X |
| 4,544,010 | 10/1985 | Friedewald ....................... 152/243 |
| 4,836,259 | 6/1989 | Lewin et al. ..................... 152/221 |

FOREIGN PATENT DOCUMENTS 12882 5/1933 Australia ........................... 152/221
173090 7/1906 Fed. Rep. of Germany .... 24/128 R

OTHER PUBLICATIONS

Packaging Box Cover-Information concerning The Tracker Traction Cables manufactured by Peerless Chain Company of Winona, Minn. (Undated).

Primary Examiner—Caleb Weston
Assistant Examiner—Gregory J. Wilber
Attorney, Agent, or Firm—Klarquist, Sparkman, Campbell, Leigh & Whinston

[57] ABSTRACT

A tire traction device for vehicle tires includes a pair of rope-like side cord members for circumferential placement on the sidewalls of a tire, and a series of wire rope cross cords which interconnect the side cords and extend across the tire tread. The cross cords are connected to the side cords at knotted connections, and a ferrule is attached to the ends of each cross cord outside of each knotted connection to prevent the cross cords from disconnecting from the side cords. Coil spring rollers are supported on the cross cords to provide additional traction. Each cross cord also supports a pair of tubular spacers located inside and adjacent the knotted connections to maintain the rollers in the center of the cross cord. One end of each side cord is knotted into a series of male connector knots while the opposite end of each side cord is knotted into a female loop knot for selective interengagement with one of the male connector knots to join the opposite ends together about a tire. The male connector knots extend between at least one pair of cross cords at the one end of the side cords to enable adjustment of the device to length simply by cutting the side cords to length from the one end and removing the necessary number of cross cords adjacent the one end.

35 Claims, 2 Drawing Sheets

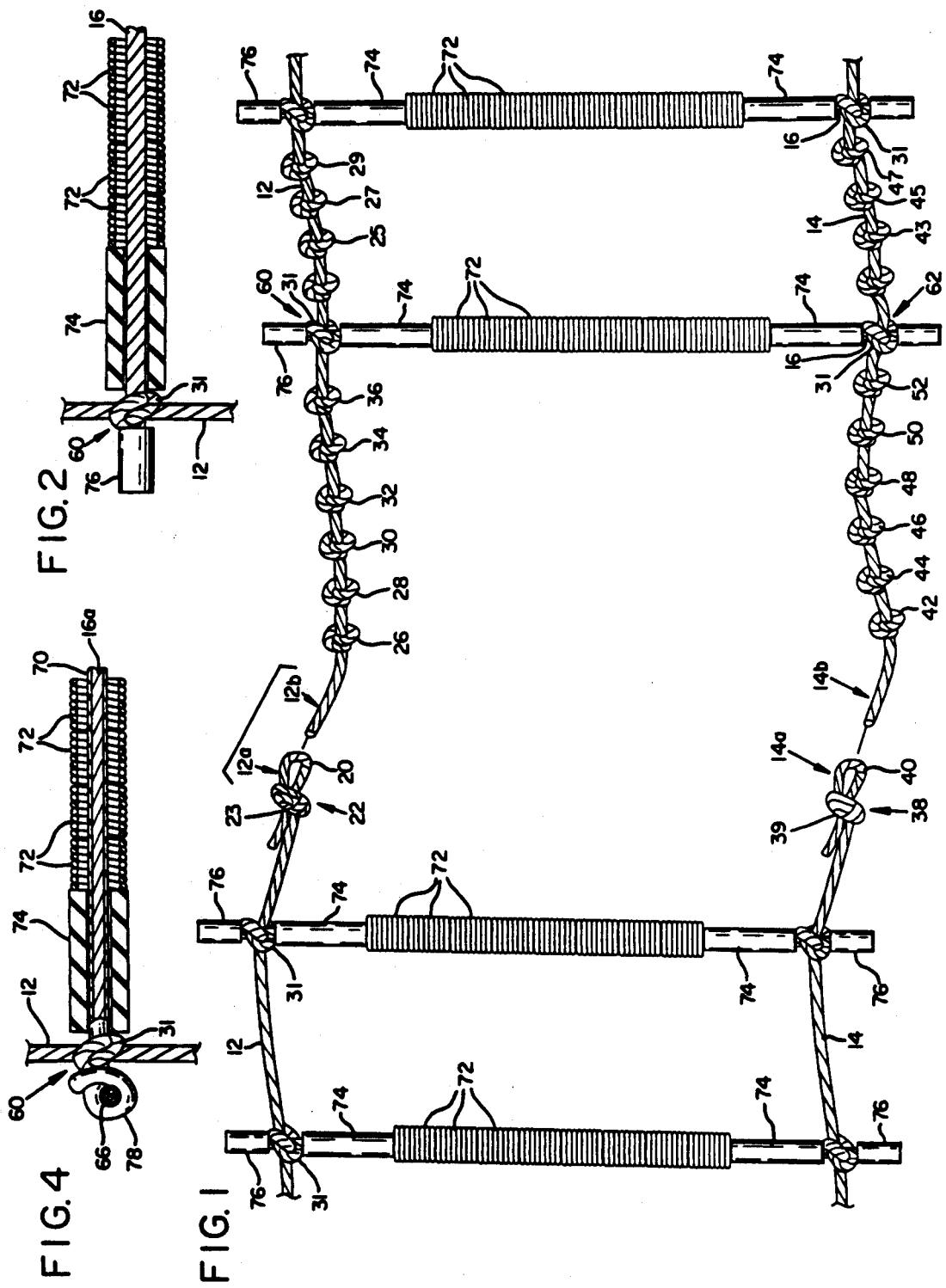

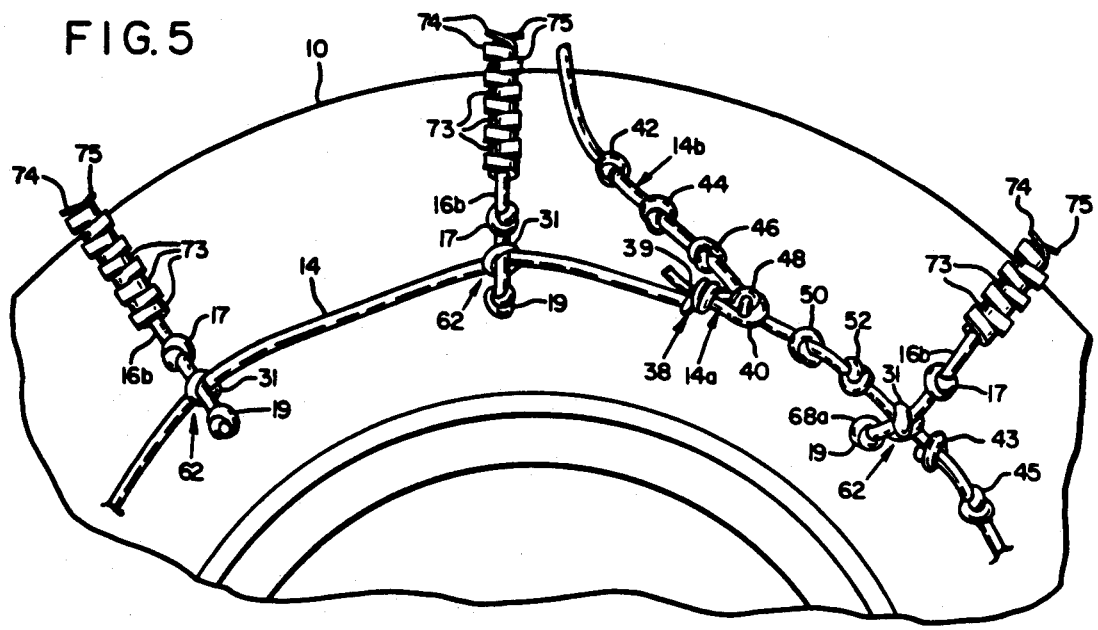
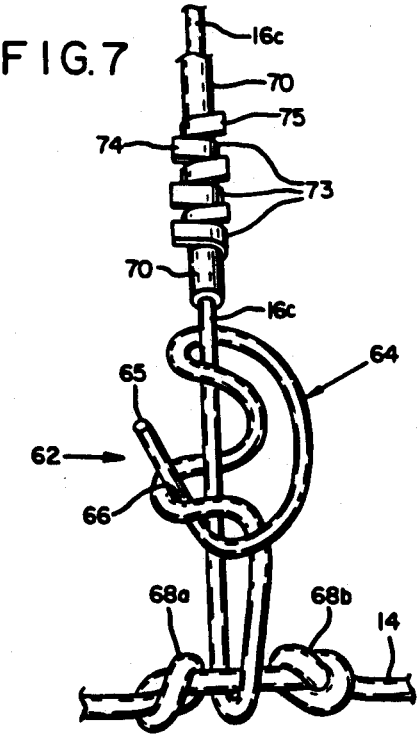
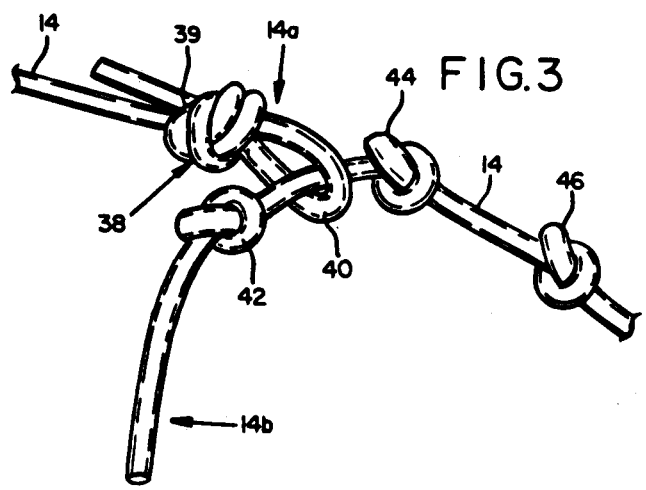
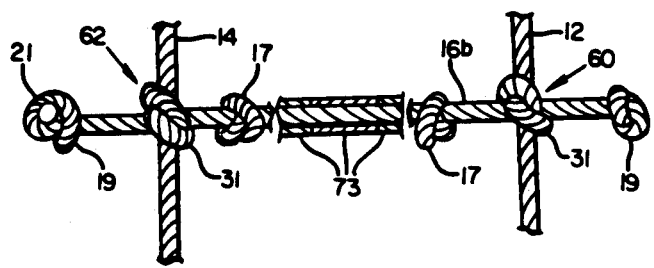

CORD-TYPE TIRE TRACTION DEVICE

BACKGROUND OF THE INVENTION

1. Field of the Invention

This invention relates to tire traction devices of the tire chain-type for tires on automotive vehicles.

2. General Discussion of the Background

Since the advent of the automobile, motorists have tried to improve the traction of pneumatic tires on low-friction surfaces. U.S. Pat. No. 1,151,389, for example, shows a rope-type traction device which was placed on the ground underneath a mired tire to provide sufficient traction for an automobile to move to less slippery ground. U.S. Pat. Nos. 990,651; 1,578,803; and 1,932,576 disclose various antiskid devices which are made of rubber and wrap around the tread face of a tire to provide traction. U.S. Pat. Nos. 4,155,390; 4,146,076; and 4,055,210 show traction devices which include a series of traction members that extend across the tread face of the tire and are held in place by a pair of ropes on opposing sidewalls of the tire. U.S. Pat. No. 1,204,887 shows another such traction device in which resilient cross members are held in place by a pair of chains on opposing sidewalls of the tire. U.S. Pat. No. 2,085,204 discloses a plurality of resilient belts which are individually wrapped around a tire such that each belt extends across the tire's tread face to prevent skidding when slippery conditions are encountered.

Radial tire chains have also become popular since the advent of radial tires. U.S. Pat. No. 3,752,204, for example, discloses a traction device for radial tires which has a pair of wire cable side members interconnected by wire cable cross members that stretch across the tread face of the tire. Tubular traction members are supported by the cross members to provide additional traction.

The previous traction devices described above include molded parts and chains or cables which are expensive to manufacture. The sophisticated manufacturing procedures and apparatuses required to produce such devices increase their costs.

Another problem with many previous tire traction devices, such as some of those discussed above, is that they are difficult to store and become tangled when not in use. This is especially true of metal traction devices for radial tires, such as the device shown in U.S. Pat. No. 3,752,204.

Another drawback with previous traction devices is that they are bulky and heavy. These are serious problems because the devices often have to be attached to tires unexpectedly along the side of a road during a snowstorm. A heavy and bulky traction device is difficult to remove from storage and position on a tire, especially during inclement weather.

Yet another problem with many traction devices is that they fit only a narrow size range of tires, and may not be transferable to other vehicles.

Still another problem common to many prior traction devices is their short life span, especially when used on bare pavement and at typical highway speeds.

Accordingly, it is a primary object of the present invention to provide a traction device which is simple and inexpensive to manufacture, without the use of sophisticated, high-cost machinery and skilled labor.

Another primary object is to provide a less bulky traction device which is simpler to store than previous devices.

Another primary object is to provide a lightweight traction device which is easy to handle and simple to install on a tire.

Yet another primary object is to provide a traction device which is tough and long-lasting despite its low cost and light weight.

Even yet another primary object of the invention is to provide a traction device which is highly effective despite its low cost and light weight.

Another important object is to provide a traction device as aforesaid which can be made in one size to fit a wide range of tire sizes so that the device need be made in only a few sizes to accommodate most tire sizes.

SUMMARY OF THE INVENTION

The foregoing objects are achieved by a chain-type tire traction device, which includes a pair of longitudinal side cord members that extend circumferentially of the tire along its opposite sidewalls. Multiple cross cord members are spaced along the length of the side cord members and extend between and join the opposite side cords. In a preferred embodiment, the side cord members are made of a non-metallic material such as fabric rope or cord. The cross cord members are made of wire rope. The cross cords are joined to the side cords at knotted connections, preferably by knotting the side cords around each cross cord. A ferrule or other enlargement at each end of the cross cord, prevents the cross cord from slipping through the knotted connection.

One end segment of each side cord is provided with a series of spaced-apart male knots. The opposite ends of the side cords have connecting female loop knots for joining the opposite ends of each side cord together about the tire, thereby allowing the traction device to be adjusted to fit tires of different sizes.

The male-knotted end segments of the side cords may include spaced knots between cross cords so that the side cords can be custom-cut to length, even between side cords if necessary, to fit a particular tire size. This feature enables a single length of the device to accommodate many different tire circumferences simply by cutting the side cords to length and removing cross cords as necessary.

While the cross cord members are preferably made of wire rope for optimum durability, they may alternatively be made of a non-metallic material such as nylon or polyester cord. Such synthetic cross cords may have heat-welded knots at their opposite ends instead of ferrules to complete their connections to the side cords.

The cross cords may be covered with a protective resilient covering, such as a rubber tubing, a vulcanized rubber or plastic coating. However, if abrasion-resistant material such as wire rope is used for the cross cords, a protective covering may be unnecessary.

The cross cords support endless, seamless coil spring steel rollers to increase traction. Alternatively, tubular steel or plastic rollers may be supported by the cross cords to provide additional traction. The rollers may be spaced from the side cord connecting knots by flexible tubular spacers or other enlargements on the cross cords inwardly of the connecting knots.

The invention also includes a method of making a traction device for vehicle tires. In accordance with this method, opposing non-metallic side cord segments are interconnected by a plurality of shorter cross cord segments of either metallic or non-metallic cord material.

The opposite ends of the cross cords are connected to the side cords by knotting the side cords around the cross cords. Ferrules or knots at the opposite ends of the cross cords prevent the cross cords from sliding back through the side cord knots. Tubular spacers, ferrules or knots may also be provided on the cross cords inwardly of their connections to the side cords to space the cross cord traction rollers from the side cord connecting knots.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a plan view of opposite end portions of a preferred embodiment of traction device in accordance with the invention.

FIG. 2 is an enlarged fragmentary view, partly in section, showing a knotted connection of a side and cross cord of the device of FIG. 1.

FIG. 3 is an enlarged, perspective view of opposite ends of a side cord of the device of FIG. 1, showing the adjustable connecting means which interconnects the opposite ends.

FIG. 4 is an enlarged fragmentary view, partly in section, similar to FIG. 2 but showing a second embodiment of the device.

FIG. 5 is a fragmentary view of a third embodiment of traction device in accordance with the invention, in place about a tire.

FIG. 6 is an enlarged foreshortened view of the knotted connections between a cross cord and a side cord in the traction device of FIG. 5.

FIG. 7 is an enlarged fragmentary view of a modified knotted connection between a side cord and cross cord and a modified cross cord assembly in a traction device otherwise like that of FIG. 5.

DETAILED DESCRIPTION OF A PREFERRED EMBODIMENT

FIG. 1 Embodiment

The present invention is a traction device for tires, such as the tires on automobiles and other vehicles. The traction device includes a pair of longitudinal side cords 12, 14 (FIG. 1), and multiple cross cords 16 (FIGS. 1 and 2) spaced along the length of side cords 12, 14 and interconnecting them. Side cords 12, 14 are made of non-metallic cord or a cord-like fabric material, preferably a flexible, lightweight, synthetic plastic material such as nylon, polypropylene or polyester. KEVLAR, an aramid plastic cord, could also be used, but is expensive. Polyester is especially suitable because of its resistance to abrasion and stretching. A urethane-bonded polyester cord has been found to have especially good strength and durability. Such cord of 5/32 inch diameter has been found to be suitable for passenger tire use, although other sizes could also be used.

Side cord 14 (FIGS. 1 and 3) has opposite ends 14a, 14b which form a connecting means that joins the opposite end portions of cord 14 to each other. End 14a is formed into a loop 40 which is knotted at 38 and welded at 39 to form the loop that will not change its size when pulled. End 14b is knotted into a plurality of spaced overhand knots 42, 44, 46, 48, 50, and 52. Side cord 12 (FIG. 1) is similarly provided with interconnectable ends 12a, 12b. End 12a is knotted at 22 and welded at 23 to provide a loop 20, and end 12b is knotted into a series of spaced overhand knots 26, 28, 30, 32, 34, and 36.

The knots on each end 12b, 14b are proportioned to be threaded through loops 20, 40, respectively, when the loop is slightly deformed to approximate a round shape. Manually deforming the knot increases the width of the eye defined by each loop such that the knot passes through the eye. The knots are large enough, however, that they cannot pass back through and out of the loop once manual deformation of the loop is discontinued, such as by tensioning the side cords about a tire.

As shown in FIG. 1, additional overhand knots 25, 27, 29, 43, 45, 47 are provided along the side cords 12, 14 between the first several cross cords 16 adjacent the male ends 12b, 14b of the side cords. This feature enables the side cords to accommodate a wide range of tire circumferences. For example, a very small circumference can be accommodated by removing one or more cross cords 16 nearest side cord ends 12b, 14b, and then cutting the side cords to the desired length from such ends.

Each cross cord 16 is joined to side cords 12, 14 at knotted connections 60, 62. A preferred form of such a knotted connection is best shown in FIG. 2. Each cross cord 16 includes a ferrule 76 attached to its opposite ends. Ferrule 76 may be made of metal, hard plastic, or other suitable material. Side cords 12, 14 (FIG. 1) are knotted into simple overhand knots 31 around cross cords 16 to form the knotted connections 60, 62. Ferrules 76 prevent cross cord 16 from slipping through side cord knots 31.

A plurality of side-by-side endless and seamless coil spring steel rollers 72 are supported by cross cords 16 to enhance traction. Flexible tubular rubber or plastic spacer sleeves 74 are also supported by cross cords 16 and provide the lateral boundaries for rollers 72. Spacer sleeves 74 maintain the rollers 72 at the midportion of cross cords 16 and thereby prevent the rollers from damaging side cord connecting knots 31. Ferrules or other enlargements could be used as spacers instead of such sleeves. The spacer sleeves are optional, however, as the chain can function without them. It has been found from extensive road testing that such cord spring steel rollers are far more resistant to flattening during use, especially on bare pavement, than more conventional seamed tubular steel rollers. As a result, the coil spring rollers are far less likely to cut, abrade or sever the supporting cross cord than such conventional rollers, even when the cross cords are made of synthetic plastic cord rather than wire rope. Good results have been achieved on passenger tires using coil spring steel rollers comprising 0.062–0.072 inch wire spring coils about ¼ inch long and with the spring having a 0.177 inch internal diameter on a cross cord having a diameter of 0.160 inch. For truck tires, 0.250 inch cross cords and 0.270 inch internal diameter spring rollers would probably be more durable.

Cross cords 16 are preferably made of wire rope, such as galvanized steel cable. It has been found that steel cable braided from seven braids, each braid consisting of seven strands, is particularly suitable for this type of use. Because of its resistance to abrasion, uncoated galvanized steel cable may be used. For example, a galvanized steel aircraft cable of either 7×7 or 7×19 size has been found to be suitable for use on passenger vehicle tires. Cable of ⅛–3/16 inch diameter is believed to be best for use on passenger tires.

Alternative Embodiments

Modified forms of the traction device are shown in FIGS. 4 through 7. These embodiments include many elements in common with the FIG. 1 embodiment, and such common elements bear the same references numerals, or if only slightly different, the same numeral followed by a reference letter. The primary differences between the several embodiments are the use of different systems of connecting knots between the side cords 12, 14 and cross cords 16, the use of different cross cord materials, and the use of steel pronged traction rollers instead of coil spring rollers.

FIG. 4 Embodiment

FIG. 4 shows an embodiment that differs from the FIG. 2 embodiment with respect to the cross cord material and the knotted connection 60 between side and cross cords. Cross cord 16a is made of a synthetic plastic cord material such as nylon, polyester, polyurethane or Kevlar. The cross cord is coated with a coating layer 70, which may comprise a vulcanized rubber or plastic material to protect the cross cord from excessive abrasion from rollers 72. However, such abrasion is minimized with the use of the seamless coil spring steel rollers 72 previously described.

Knotted connection 60 comprises an end of cross cord 16a connected to side cord 12 by knotting side cord 12 around cross cord 16a to form side cord knot 31, as described with respect to FIGS. 1 and 2. An end knot 78 is tied at the opposite ends of cross cord 16a to prevent it from slipping through side cord knot 31. The end of end knot 78 is then heat-welded at 66 to prevent the knot from becoming untied.

The tubular spacer sleeve 74 is supported by cross cord 16a and positioned between rollers 72 and side cord knot 31 to maintain the rollers 72 in the mid-portion of cross cord 16a and thereby prevent the rollers from damaging side cord knots 31.

Although the FIG. 4 embodiment has been found to be quite satisfactory in road tests, it is not as durable, especially at high speeds and on bare pavements, as the FIG. 1 embodiment. However, the FIG. 1 embodiment is heavier and more expensive to manufacture than the FIG. 4 embodiment. Nevertheless, both embodiments are considerably less costly to manufacture and are at least as effective and durable as all-metal cable chain devices of the prior art.

FIG. 5 Embodiment

Referring to FIGS. 5 and 6, a third embodiment is shown that differs from the FIG. 1 embodiment with respect to the knotted side cord connections 60, 62, the synthetic cross cord material, and the traction rollers 73. The third embodiment also differs from the FIG. 1 embodiment in the type of traction rollers used and in the manner by which they are centered on the cross cords.

Each cross cord 16b is joined to side cords 12, 14 at knotted connections 60, 62. A preferred form of such knotted connections is best shown in FIG. 6. Each cross cord 16b is knotted into a pair of simple spaced overhand knots, including stop knots 17 and end knots 19 at each of the opposite ends of the cross cord. Each knot 19 is heat seared or welded at 21 to prevent the knot from unraveling. Cross cord 16b is connected to side cords 12, 14 by simply knotting side cords 12, 14 into overhand knots 31 around cross cord 16b between knots 17, 19. Although side cords 12, 14 are able to slide along cross cord 16b at knots 31, their range of movement is limited by knots 17, 19. Knots 31 in FIG. 6 are shown positioned midway between each pair of knots 17, 19. However, during use, knots 31 are preferably positioned against end knots 19.

A plurality of side-by-side hard rollers 73 are supported by cord 16b. Each roller 73 has a forward prong 74 and a rearward prong 75 to enhance the road-gripping ability of the cross cords. The plurality of rollers 73 extend across cord 16b between stop knots 17. Stop knots 17 prevent rollers 73 from traveling along the cross cords 16b to connecting knots 31 and thereby prevent them from damaging the connecting knots. The rollers are made of metal or a hard, tough plastic such as KEVLAR.

The side and cross cords are preferably made from a stretch and abrasion-resistant synthetic cord such as polyester. The cross cords may be coated or uncoated, but a urethane bonded or rubber coated cross cord will have greater durability than an uncoated one. In any case, the side and cross cord materials are preferably a meltable synthetic cord so that the various end knots in the side and cross cords can be heat-seared to weld them in place.

FIG. 7 Embodiment

Another modified form of the traction device is shown in FIG. 7. It includes many elements in common with the preceding embodiments, and such common elements bear the same reference numerals. The primary difference between this and the preceding embodiments is the use of a different system of connecting knots between the side cords 12, 14 and cross cords.

Referring to FIG. 7, a side core 14 is connected to a cross cord 16c at a knotted connection 62 formed by tying an end of the cross cord to the side cord using, for example, a fisherman's knot 64 or other suitable slip knot. The knot 64 shown in FIG. 7 is tightened to securely grip side cord 14. The free end 65 of cross cord 16c is then heat-welded to the knot, for example at 66, to prevent the knot from loosening. Alternatively, the end 65 of cord 16c can be heated to melt and expand it so that the end cannot be pulled back through knot 64. Side cord 14 is knotted into a pair of secondary knots 68a, 68b on each side of knot 64 to prevent longitudinal displacement of knot 64 along side cord 14. The opposite side cord (not shown) is similarly connected to the opposite end of cross cord 16c. The secondary knots are positioned closely adjacent the knotted connection they surround to maintain each knotted connection substantially stationary.

A resilient covering or coating 70 surrounds all or at least a major portion of each cross cord 16c to protect it from damage during use. The covering 70 shown is a rubber tube which fits closely around cross cord 16c and extends substantially along its entire length, except for its knotted ends. Alternatively, a layer of rubber may be vulcanized onto cord 16c along its major length to cover and protect it. Another alternative is to use a nylon or urethane sheath or coating. However, if a polyester cord is used as cross cords 16c, especially a urethane bonded polyester, a sheathing or coating may not be necessary.

A series of side by side, prolonged tubular rollers 73 are supported by cords 16c or by their resilient coverings 70 if used. Rollers 73 are preferably made of hard metal or synthetic material such as KEVLAR and each has a pair of small projections or prongs 74, 75 which point in substantially opposite directions and increase traction by digging into an ice or snow-covered road surface.

Cross cords 16c may be knotted with simple overhand stop knots (not shown) inwardly of their knotted connections to the side cords 12, 14 similar to stop knots 17 of the FIG. 5 embodiment. Such stop knots serve as stop means to limit lateral travel of rollers 73 along the side cords, or the tubing on which they are mounted, so that they cannot damage the knotted connections 62 of the cross cords to the side cords.

Method of Manufacture

The preferred method of assembling the traction device of FIG. 1 is to cut a pair of cord segments of substantially equal length from a length of synthetic cord to provide the pair of side cords 12, 14. A plurality of cord segments of substantially equal length, but of shorter length than side cords 12, 14, are cut from a length of wire rope or sythetic cord to provide cross cords 16. Before cross cords 16 are attached to side cords 12, 14, female loop ends 12a, 14a are made and the side cords are knotted to provide knots 25, 27, 29, 43, 45 and 47. The male end knots are formed after the cross cords have been connected to form knots 26, 28, 30, 32, 34, 36, 42, 44, 46, 48, 50 and 52.

Referring more specifically to FIG. 2, a first ferrule 76 is attached to one end and rollers 72 are then threaded onto the cross cords 16 with a tubular spacer 74 installed on each side of the rollers. A second ferrule 76 is then attached to the opposite end of the cross cord 16, leaving enough space between ferrules 76 and spacers 74 to allow side cords 12, 14 to be knotted around the cross cords 16. Simple overhand knots may be used to tie side cords 12, 14 around cross cords 16. The side cords can be knotted to the cross cords either before or after ferrules 76 are attached to the ends of the cross cords, although usually it will be easier to apply the ferrules before attaching the side cords.

The method of manufacturing the traction device of FIG. 4 is similar to that described for the device of FIG. 1 except the cross cords of the former are made of a synthetic material such as plastic or nylon and include a protective coating 70 which consists of a vulcanized rubber or plastic material to resist abrasion from rollers 72. Additionally, the ferrules 76 are omitted, and instead end knots 78 are tied at opposite ends of the cross cords 16. End knots 78 can be tied either before or after the side cord connecting knots 31 are formed.

The method of manufacturing the device of FIG. 5 is similar to that described for the device of FIG. 4, except stop knots 17 are substituted for the spacer tubes on the cross cords of the FIG. 5 device. Stop knots 17 should be formed before the side cords are knotted to the cross cords.

The method of manufacturing the traction device of FIG. 7 is also similar to the method described for the device of FIG. 4, except that the knotted connection is formed by tying the end of cross cord 16c to side cord 14 using a slip knot 64, such as a fisherman's knot. Pairs of spaced overhand knots 68a, 68b are knotted in the side cords 12, 14 before the cross cords 16c are connected. Additionally, pronged steel or plastic rollers instead of coil spring rollers are assembled on the cross cords before such cords are attached to the side cords.

In all forms of the device described, the male connecting knots are preferably extended along the side cords 12, 14 between cross cords 16, as at 25, 27, 29 and 43, 45, 47, as shown in FIG. 1, at the male ends of the side cords. This feature enables the device to be manufactured and marketed in only a few lengths at most, and allows the user then to cut the male ends of the side cords to the proper length to fit the tires of the user's vehicle, removing cross cords as necessary to fit the device to tires of smaller diameters.

With reference to FIG. 1, the assembled traction device is laid out lengthwise in front of a tire, and the vehicle is moved forward until the tire covers about one-quarter of the length of the device. Alternatively, the traction device can be placed over the tire from the top, without moving the vehicle. The longitudinal side cord members 12, 14 are then positioned circumferentially along opposite sidewalls of the tire. Loop 20 is manually deformed to widen the slit in the loop and allow the knots on end 12b to pass through it. Loop 40 is similarly deformed to increase its slit width and pass knots on end 14b through it. The circumference of the device can be varied by passing any number of knots 26-36 through loop 20 or knots 42-52 through loop 40, until the device is securely in place circumferentially around the tire.

Three alternative knotting systems are disclosed for joining the side and cross cords. Obviously, there may be other knotting systems that will work, but the three disclosed have been found to be the most practical at this time.

In addition, several alternative types of traction rollers have been disclosed. While the preferred embodiment is the coil spring roller, such rollers could also be made of metal or a variety of plastics. The tubular rollers could be either seamless or non-seamless, and pronged or unpronged.

Having illustrated and described the principles of my invention with reference to a preferred embodiment and several alternatives, it should be apparent to those persons skilled in the art that such invention may be modified in arrangement and detail without departing from such principles. I claim as my invention all such modifications as come within the true spirit and scope of the following claims.

I claim:

1. A tire traction device for vehicle tires having treads, comprising:
    a pair of longitudinal side cord members for extending circumferentially of a tire along opposite sidewalls thereof, opposite ends of each said side cord member being interconnectable; and
    multiple cross cord members spaced along the length of said side cord members and extending between and joining said pair of side cord members for extending across said tire treads, said cross cord members being joined to said side cord members at knotted connections;
    each knotted connection including at least one knot on the connected side cord member and adjacent means on the connected cross cord member cooperable with the knot to at least limit relative lateral displacement of the connected side and cross cord members at the knotted connection.

2. The device of claim 1 wherein opposite end portions of each side cord member are knotted to form mating male and female connecting knots for joining said opposite end portions together about a tire.

3. The device of claim 1 including plural helical wire coil rollers supported on each said cross cord member.

4. The traction device of claim 1 including plural traction rollers supported on the cross cord members.

5. The traction device of claim 4 wherein the traction rollers are helical wire coil rollers.

6. The traction device of claim 4 wherein the cross cord members are individually covered with a protective covering.

7. The traction device of claim 4 including spacer means on said cross cord members inwardly of the knotted connections to protect the knotted connections from the rollers.

8. The traction device of claim 4 wherein said cross cord members are made of synthetic cord.

9. The traction device of claim 8 wherein each traction roller is a segment of a closely wound coil steel spring.

10. The traction device of claim 8 wherein the cross cord members comprise coated synthetic plastic cord.

11. The traction device of claim 4 wherein the cross cord members comprise wire rope.

12. The traction device of claim 11 including plural helical wire coil rollers supported on said cross cord members.

13. The traction device of claim 12 wherein each wire coil roller is a segment of a closely wound coil steel spring.

14. The traction device of claim 12 wherein the wire coil rollers are made from wire having a circular cross-section.

15. The traction device of claim 14 wherein each wire coil is a segment of a closely wound coil steel spring.

16. A tire traction device for vehicle tires having treads, comprising:
   a pair of longitudinal side cord members for extending circumferentially of a tire along opposite sidewalls thereof, opposite ends of each said side cord member being interconnectable; and
   multiple cross cord members spaced along the length of said side cord members and extending between and joining said pair of side cord members for extending across said tire treads, said cross cord members being joined to said side cord members at knotted connections;
   opposite ends of each side cord member being knotted to form mating male and female connecting means for joining said opposite ends together about a tire;
   said male connecting means including multiple connector knots spaced along one end portion of each side cord member and said female connecting means including a knotted loop at the other end portion for selective interengagement with one of said knots;
   said connector knots extending between at least one adjacent pair of cross cord members adjacent said one end portion.

17. The traction device of claim 16 wherein the side cord members comprise synthetic plastic cord and the cross cord members are metal.

18. The traction device of claim 16 wherein the side cord members and the cross cord members comprise synthetic plastic cord.

19. The traction device of claim 16 including plural traction rollers supported on the cross members.

20. The traction device of claim 19 wherein the traction rollers are helical wire coil springs.

21. A tire traction device for vehicle tires having treads, comprising:
   a pair of longitudinal side cord members for extending circumferentially of a tire along opposite sidewalls thereof, opposite ends of each said side cord member being interconnectable; and
   multiple cross cord members spaced along the length of said side cord members and extending between and joining said pair of side cord members for extending across said tire treads, said cross cord members being joined to said side cord members at knotted connections;
   said cross cord members being made of wire rope, and the side cord members being made of synthetic cord, each of said knotted connections including an overhand knot on a side cord member connecting the side cord member to the connected wire rope cross cord member;
   each wire rope cross cord member including a ferrule at each of its opposite ends outwardly of an adjacent said overhand knot.

22. The traction device of claim 21 including plural traction rollers supported on the cross members.

23. The traction device of claim 22 wherein the rollers are helical wire coil rollers.

24. The traction device of claim 23 including spacer means on said cross cord members inwardly of the knotted connections to protect the knotted connections from the rollers.

25. The traction device of claim 23 wherein each wire coil is a segment of a closely wound coil steel spring.

26. The traction device of claim 25 wherein the coil spring wire is of a circular cross section.

27. The traction device of claim 23 wherein the coil spring wire is of a circular cross section.

28. The traction device of claim 27 wherein the cross cords are uncoated.

29. A tire traction device for vehicle tires having treads, comprising:
   a pair of longitudinal side cord members for extending circumferentially of a tire along opposite sidewalls thereof, opposite ends of each said side cord member being interconnectable; and
   multiple cross cord members spaced along the length of said side cord members and extending between and joining said pair of side cord members for extending across said tire treads, said cross cord members being joined to said side cord members at knotted connections;
   said side and cross cord members being made of flexible plastic cord;
   said knotted connection comprising a side cord connecting knot formed by knotting said side cord member around said cross cord member such that a free end portion of said cross cord member extends laterally outwardly of the connecting side cord member, and an end knot in the free end portion of said cross cord member laterally outwardly of the connecting knot.

30. The traction device of claim 29 wherein the knotted connection includes a stop knot in the cross cord member laterally inwardly of the connecting knot.

31. A tire traction device for vehicle tires having treads, comprising:
   a pair of longitudinal side cord members for extending circumferentially of a tire along opposite sidewalls thereof, opposite ends of each said side cord member being interconnectable; and
   multiple cross cord members spaced along the length of said side cord members and extending between and joining said pair of side cord members for extending across said tire treads, said cross cord members being joined to said side cord members at knotted connections;

said knotted connection including a primary knot formed by knotting an end of said cross cord member around said side cord member, and a secondary knot in said side cord member on each side of and adjacent said primary knot.

32. A tire traction device for vehicle tires, comprising:

a pair of flexible side cord members formed of synthetic cord material for extending circumferentially of a tire along opposite sidewalls thereof;

opposite end portions of each side cord member being knotted to form mating male and female knotted connecting means for joining said opposite end portions together about a tire;

multiple cross cord members spaced along the length of the side cord members and extending between the opposite side cord members for extending across the tire tread;

connecting means connecting opposite end portions of said cross cord members to said side cord members;

plural helical wire coil rollers supported on said cross cord members;

said side and cross cord members being made of flexible cord segments, and the connecting means including connecting knots formed in the cord segments of the side cord members knotted around the cross cord members such that free end portions of the cross cord members extend laterally outwardly beyond the connecting knots of the side cord members, the opposite free end portions of the cross cord members including enlarged end portions laterally outwardly of the connecting knots of the side cord members to retain the said cross cord members on the side cord members;

each cross cord member including a pair of spacer means laterally inwardly adjacent each connecting knot for limiting movement of said side cord members along said cross cord members and for limiting travel of said rollers along said cross cord members to prevent said roller from engaging said connecting knots;

one end portion of each side cord member being knotted at spaced intervals along its length to form a series of spaced apart enlarged male connector knots, and the opposite end portion of each side cord member being knotted to form a female loop knot for interengagement with a selected one of said male connector knots, said series of male connector knots extending along said one end portion between at least one pair of adjacent cross cord members.

33. A traction device according to claim 32 wherein said side cord members are made of a synthetic plastic cord material and said cross cord members are made of wire rope.

34. A traction device according to claim 32 wherein both said side cord members and said cross cord members are composed of a synthetic plastic cord material.

35. A tire traction device for vehicle tires, comprising:

a pair of flexible side cord members formed of synthetic cord material for extending circumferentially of a tire along opposite sidewalls thereof;

opposite end portions of each side cord member being knotted to form mating male and female knotted connecting means for joining said opposite end portions together about a tire;

multiple cross cord members spaced along the length of the side cord members and extending across the tire tread; and connecting means connecting opposite end portions of said cross cord members to said side cord members;

the male knotted connecting means comprising multiple male side cord knots spaced along one end portion of the side cord member to form multiple enlargements of the one end portion;

the female knotted connecting means comprising a side cord knot forming a loop in the side cord at the end thereof opposite said one end portion for receiving any one of the enlargements;

the multiple enlargements on the side cord members including at least one said enlargement on each side cord member between at least one adjacent pair of cross cord members adjacent said one end portion, such that by disconnecting from the side cord members any cross cord member between said one enlargement and an end of said one end portion, said one enlargement can cooperate with said loop to join the opposite ends of the side cord member.

* * * * *